UNITED STATES PATENT OFFICE.

ALFRED ZUCKER, OF DRESDEN, GERMANY.

COMPOSITION FOR PRODUCTION OF AROMATIC BATHS.

No. 875,764.  Specification of Letters Patent.  Patented Jan. 7, 1908.

Application filed November 26, 1906. Serial No. 345,144.

*To all whom it may concern:*

Be it known that I, ALFRED ZUCKER, a subject of the King of Bavaria, and resident of 63 Schnorr street, Dresden, in the Kingdom of Saxony, German Empire, have invented a new and useful Composition of Matter to be Used for the Production of Aromatic Baths, of which the following is an exact specification.

The present invention consists in a composition of matter for use in making aromatical baths, and consisting of a mixture of ingredients as hereinafter to be described and to be added to water at the time of use.

The substances serving for the production of the aromatical bath are insoluble in water and possesses aromatical and therapeutical properties. Hitherto certain herbs were boiled for this purpose and the obtained decoction added to the bath. Of late these aromatical or other substances are added in form of a mixture in alcoholic or acetic acid solutions. But these latter methods exhibit a very bad defect, viz. if these mixtures are poured into the bath water, the larger portions of the dissolved substances will show at once the tendency to separate in form of large drops or flocks, whereas only a very small fraction mingles with the bathing water and is kept there in suspense.

Now the composition in question has the purpose in view, to deliver these volatile oils and other like substances in such a form, that same will not separate themselves at the moment of being poured into the bath water, but diffuse evenly in minute globular form in the whole volume of the bath water, thus giving the latter a milk-like appearance (emulsion).

According to my invention and for attaining the purpose intended I mix alcohol, volatile oil and soap and formic ether is added to this mixture. Due to the mixture of formic ether with the other ingredients the formic ether alone mixing very badly with water is caused to mix easy with the water. Experiments were made to obtain the same results with common ether, but these only prove that the use of formic ether has by far the most advantages. These advantages obtained by embodying formic ether into the above mentioned composition are as follows:—

1. Considerably larger quantities of volatile oil can be dissolved than by using an alcohol soap solution alone.

2. The composition containing formic ether, soap and volatile oil as proposed by the inventor, keeps clear for an unlimited time. This has been proved by experiments of long years standing.

3. Formic ether has the peculiar quality of softening water even if added to same in very small quantities. Particular stress is laid upon this very property of formic ether, as it has been hitherto unknown.

In the following an example of the composition is given: 30 parts of dwarf-pine-oil are dissolved in 60 grams of formic ether, into which mixture 120 grams of common soft soap or some other liquid soap are worked, until a perfectly clear solution is obtained. In place of volatile oil other substances acting in a like therapeutical manner, such as thymol, or artificially made smelling substances, such as terpinol, ionone and so on can be used.

Having thus fully described the nature of my invention, what I desire to secure by Letters Patent of the United States is:—

1. The hereindescribed novel composition of matter, consisting of alcohol, soap, formic ether and volatile oil.

2. The hereindescribed novel composition of matter for the production of aromatical baths, consisting of 30 grams of dwarf-pine-oil, 60 grams of formic ether and 120 grams of common soft soap.

In witness whereof I have hereunto set my hand in the presence of two witnesses.

ALFRED ZUCKER.

Witnesses:
 ULYSSES J. BYWATER,
 PAUL ARRAS.